United States Patent
Taira et al.

(12)

(10) Patent No.: US 9,941,631 B1
(45) Date of Patent: Apr. 10, 2018

(54) PLUG AND CABLE WITH PLUG

(71) Applicant: SEIKOH GIKEN CO., LTD., Chiba (JP)

(72) Inventors: Junji Taira, Chiba (JP); Masayuki Jibiki, Chiba (JP); Yohei Takaishi, Chiba (JP); Norimasa Arai, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 0 days.

(21) Appl. No.: 15/637,417

(22) Filed: Jun. 29, 2017

(51) Int. Cl.
| | |
|---|---|
| *H01R 13/00* | (2006.01) |
| *H01R 13/633* | (2006.01) |
| *H01R 24/28* | (2011.01) |
| *H01R 13/502* | (2006.01) |
| *H01R 13/627* | (2006.01) |
| *H01R 13/08* | (2006.01) |
| *H01R 103/00* | (2006.01) |
| *H01R 13/62* | (2006.01) |

(52) U.S. Cl.
CPC ......... *H01R 13/6335* (2013.01); *H01R 13/08* (2013.01); *H01R 13/502* (2013.01); *H01R 13/6273* (2013.01); *H01R 24/28* (2013.01); *H01R 13/62* (2013.01); *H01R 2103/00* (2013.01); *Y10S 439/923* (2013.01)

(58) Field of Classification Search
CPC .. H01R 13/62; H01R 13/6335; Y10S 439/923
USPC .................................................. 439/483, 923
See application file for complete search history.

(56) References Cited

U.S. PATENT DOCUMENTS

| | | | |
|---|---|---|---|
| 5,638,474 A | 6/1997 | Lampert et al. | |
| 7,297,013 B2 * | 11/2007 | Caveney | H01R 13/6272 439/352 |
| 7,901,237 B2 * | 3/2011 | Abe | H01R 43/26 439/354 |
| 8,221,007 B2 | 7/2012 | Peterhans et al. | |
| 8,794,998 B2 * | 8/2014 | Hashimoto | H01R 13/62 439/344 |
| 8,899,845 B2 | 12/2014 | Gallegos et al. | |

FOREIGN PATENT DOCUMENTS

| | | |
|---|---|---|
| JP | 9-113762 A | 5/1997 |
| JP | 2001-141961 A | 5/2001 |
| JP | 2009-229545 A | 10/2009 |

\* cited by examiner

*Primary Examiner* — Tho D Ta
(74) *Attorney, Agent, or Firm* — Kenealy Vaidya LLP

(57) ABSTRACT

A plug attached to a terminal part of a cable includes a plug main body to be connected to an adaptor, a latch, which is provided at the plug main body so as to be elastically displaceable from an outside of the plug main body toward an outer surface of the plug main body and which is engaged to the adaptor, and a slider including a cover part that is disposed at the outside of the latch. When the cover part is pushed down toward the outer surface or when the slider is moved in an extraction direction in which the plug main body is to be extracted from the adaptor, the latch is pushed down toward the outer surface and the engaging state of the latch is released.

6 Claims, 9 Drawing Sheets

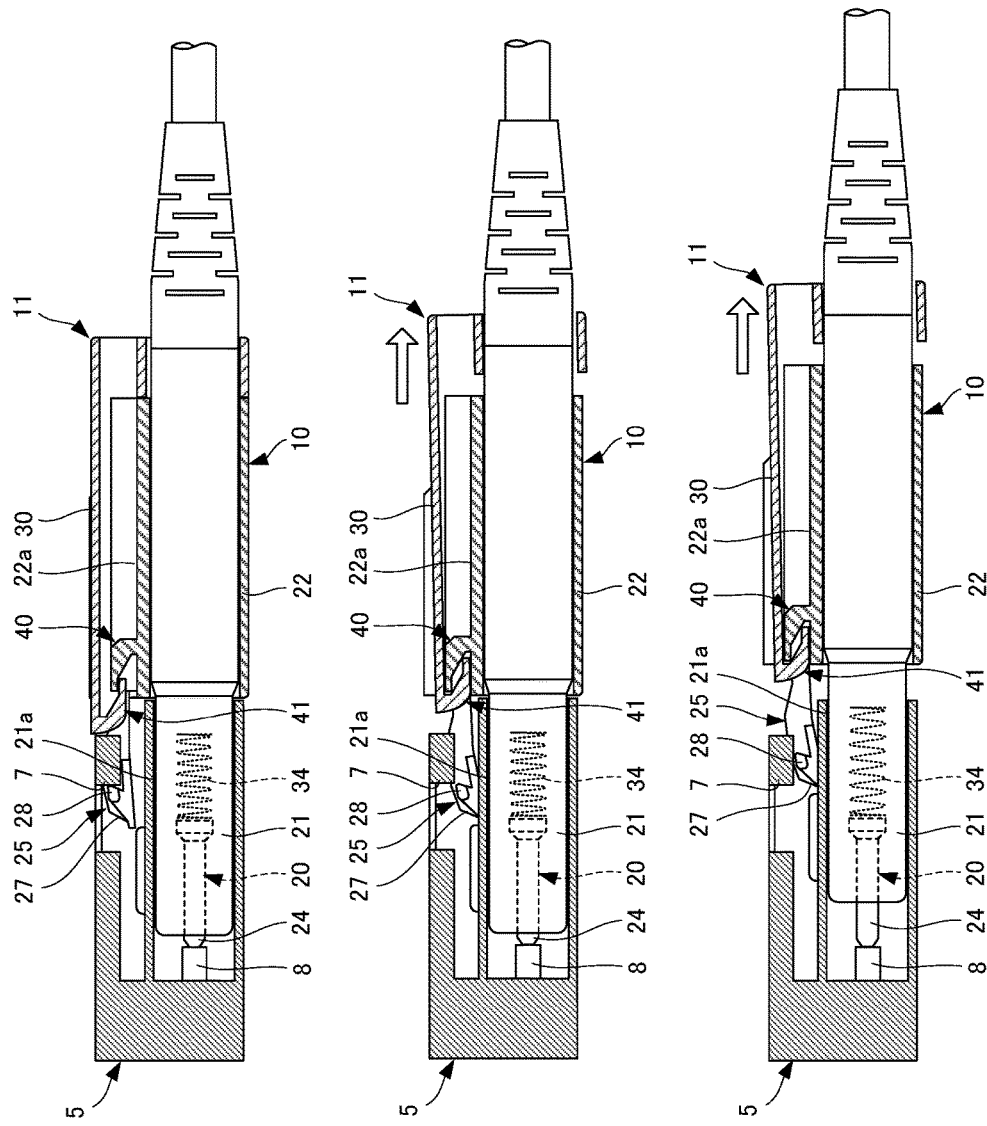

PLUG AND CABLE WITH PLUG

TECHNICAL FIELD

The disclosure relates to a plug and a cable with plug.

BACKGROUND ART

An optical fiber cable and an optical module such as a receiver and a transmitter or the other optical fiber cable are connected via an adapter (including a so-called receptacle), and a plug to be connected to the adapter is provided at a terminal part of the optical fiber cable. As the plug, a plug has been known which includes in general a latch to be engaged to the adapter and an operation member for releasing an engaging state between the latch and the adapter.

A connector (plug) disclosed in JP-A-H09-113762 includes a trigger as the operation member. The latch extends from a plug end of the connector to be inserted into a jack socket (adapter) toward an opposite cable entry end, and a fixed end of the plug end-side is fixed to an outer surface of the connector, and a free end of the cable entry end-side is configured to be vertically moveable with respect to the outer surface of the connector. The trigger extends from the cable entry end of the connector toward the plug end, and a fixed end of the cable entry end-side is fixed to the outer surface of the connector, and a free end of the plug end-side is configured to be vertically moveable with respect to the outer surface of the connector. The free end of the trigger is disposed on the free end of the latch. When the trigger is pushed down toward the outer surface of the connector, the free end of the trigger and the free end of the latch are engaged with each other, so that the latch is also pushed down toward the outer surface of the connector. The latch is pushed down, so that the engaged state of the latch is released.

An optical connector assembly (plug) disclosed in JP-A-2001-141961 includes a housing as the operation member. The latch extends with being inclined so that it is gradually spaced from an outer surface of an optical connector plug from a tip end portion of the optical connector plug toward a rear end portion. The optical connector plug is inserted in a plug insertion hole formed in the housing, and the housing is supported to the optical connector plug so as to be moveable from the tip end portion of the optical connector plug toward the rear end portion. When the housing is pulled toward the rear end portion of the optical connector plug, the latch is pushed down toward the outer surface of the optical connector plug via a latch release member between the housing and the latch. The latch is pushed down, so that the engaged state of the latch is released.

As the plug in which the engaged state of the latch is released by a pulling operation for the operation member, an optical connector plug disclosed in JP-A-2009-229545, a plug connector disclosed in U.S. Pat. No. 8,221,007, and an optical fiber connector disclosed in U.S. Pat. No. 8,899,845 have been also known.

SUMMARY

In the connector disclosed in JP-A-H09-113762, the trigger serving as the operation member is pushed down, so that the engaged state of the latch is released. Also, in the optical connector assembly disclosed in JP-A-2001-141961, the housing serving as the operation member is pulled, so that the engaged state of the latch is released. Like this, in the plug of the related art, the operation for the operation member, which is performed when releasing the engaged state of the latch, includes the pushing-down operation and the pulling operation. The plug of the related art corresponds to only one operation, so that a user may be confused. That is, there is a difficulty in terms of the usability.

The disclosure has been made in view of the above situations, and an object thereof is to provide a plug having excellent usability and a cable with plug.

According to a plug of the disclosure, the plug comprises: a plug main body to be connected to an adapter; a latch provided at the plug main body so as to be elastically displaceable from an outside of the plug main body toward an outer surface of the plug main body, the latch being configured to be engaged to the adapter at a state where the plug main body is connected to the adapter and to be released from an engaged state to the adapter as the latch is displaced from the outside toward the outer surface; and a slider comprising a cover part that is disposed at the outside of the latch, wherein the slider is supported to the plug main body such that the slider is able to push down the cover part from the outside toward the outer surface, and the slider is supported to the plug main body such that the slider is moveable in an extraction direction in which the plug main body is to be extracted from the adapter, wherein the plug main body and the cover part have engaging portions to be engaged with each other, respectively, and at least one of the engaging portion of the plug main body and the engaging portion of the cover part is provided with a guide surface configured to come close to the outer surface of the plug main body as approaching toward the extraction direction, wherein when the cover part is pushed down toward the outer surface, the latch is pushed down integrally with the cover part toward the outer surface, and wherein when the slider is moved in the extraction direction, one of the engaging portions is slid along the guide surface of the other of the engaging portions, so that the cover part comes close to the outer surface of the plug main body and the latch is pushed down toward the outer surface by the cover part.

Further, according to a cable with plug of the disclosure, the plug is attached to a terminal part.

According to the disclosure, it is possible to provide the plug having excellent usability and the cable with plug.

BRIEF DESCRIPTION OF THE DRAWINGS

FIG. 9A A sectional view depicting operations of the respective parts of the plug when the connecting state between the adapter and the plug is released.

FIG. 9B A sectional view depicting operations of the respective parts of the plug when the connecting state between the adapter and the plug is released.

FIG. 9C A sectional view depicting operations of the respective parts of the plug when the connecting state between the adapter and the plug is released.

DESCRIPTION OF ILLUSTRATIVE EMBODIMENTS

Hereinafter, illustrative embodiments will be described with reference to the drawings.

Figure 1:
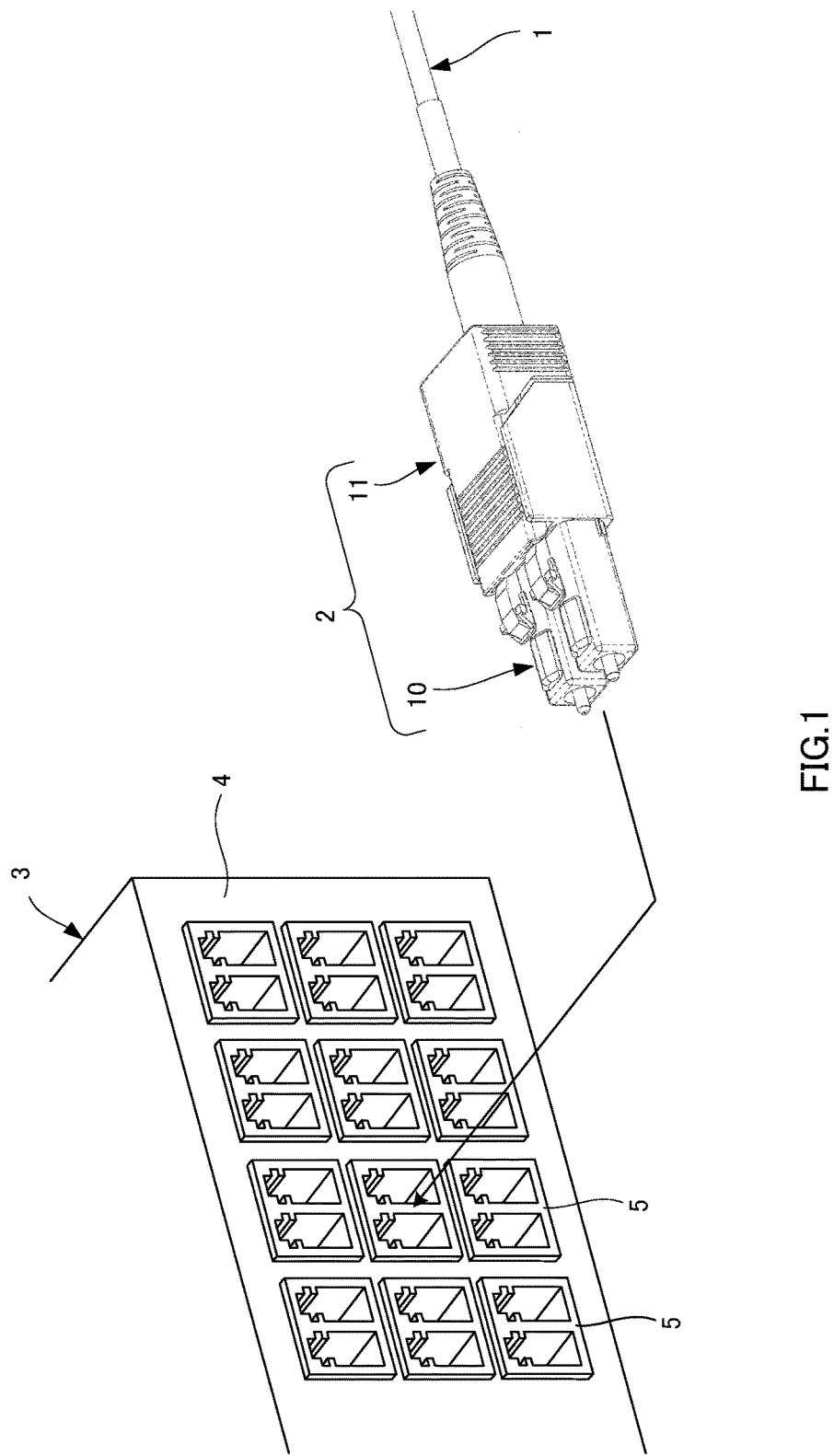
FIG. 1 A perspective view of an example of a cable with plug.

A cable 1 shown in FIG. 1 is an optical fiber cable. A plug 2 is attached to a terminal part of the optical fiber cable 1. The plug 2 is connected to an adapter 5 provided for a panel 4 of a device 3. The device 3 is a communication device or a distribution frame. The optical fiber cable 1 is connected to an optical module mounted on the communication device or another optical fiber cable accommodated in the distribution frame, via the adapter 5.

The adapter 5 includes an adapter, so-called receptacle of which a connecting hole is provided only at a front surface of the panel 4, and an adapter of which a connecting hole is provided at a front surface and a back surface of the panel 4. The adapter of which the connecting hole is provided only at the front surface of the panel 4 is typically used to connect the optical fiber cable 1 and the optical module, and the adapter of which the connecting hole is provided at the front surface and the back surface of the panel 4 is typically used to connect the optical fiber cable 1 and another optical fiber cable.

Figure 2:
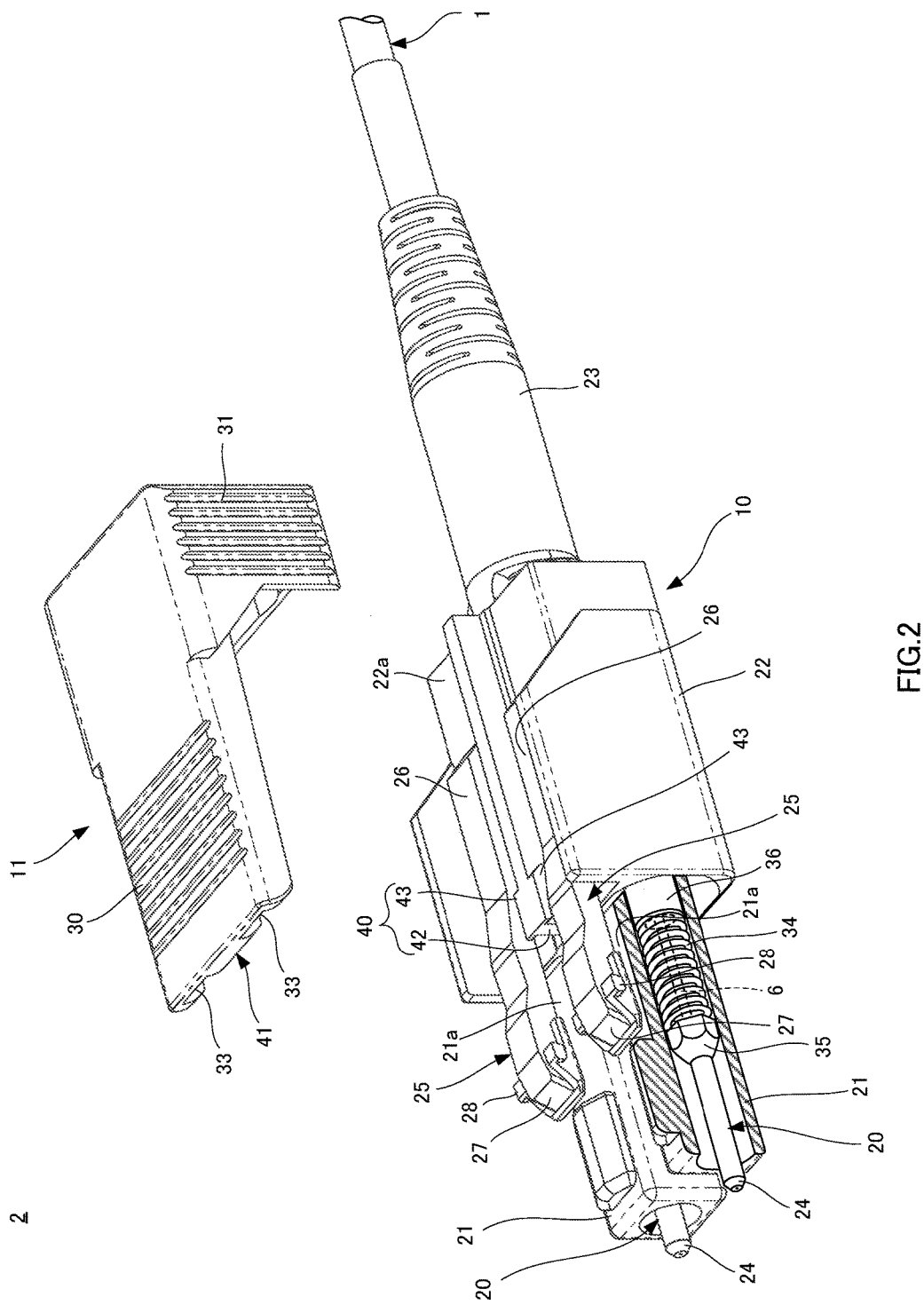
FIG. 2 An exploded perspective view of a plug.
Figure 3:
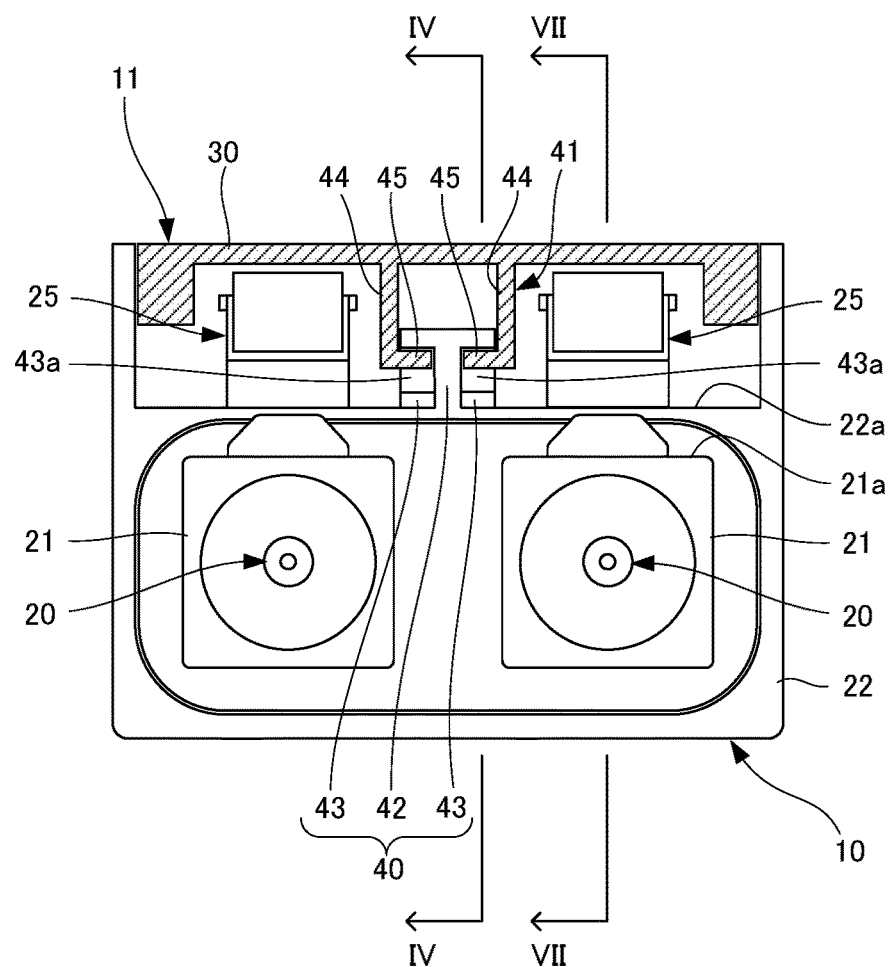
FIG. 3 A front view of the plug and a sectional view of a slider.
Figure 4:
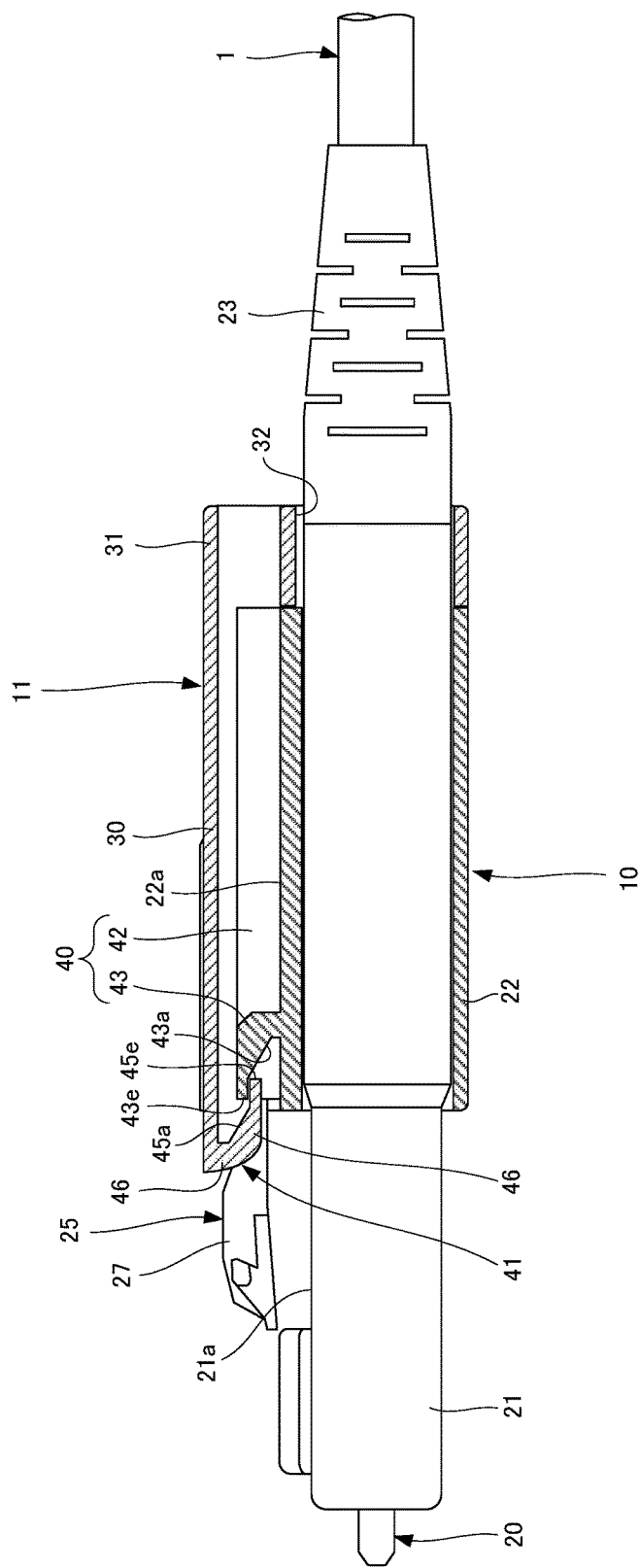
FIG. 4 A sectional view taken along a line IV-IV of FIG. 3.

FIGS. 2 to 4 depict a configuration of the plug 2. The plug 2 has a plug main body 10 and a slider 11.

The plug main body 10 has ferrules 20 serving as a holding member configured to hold core wires (optical wires) 6 of the optical fiber cable 1, plug frames 21 configured to support the ferrules 20, and a latch frame 22 configured to support the plug frames 21. In this example, the ferrule 20 is provided for each core wire, and the plug frame 21 is provided for each ferrule 20. The optical fiber cable 1 may be a single core cable or a multi-core cable having two or more cores, and the numbers of the ferrules 20 and the plug frames 21 are appropriately changed depending on the number of the cores of the optical fiber cable 1. In the meantime, the ferrule 20 may be a multi-core ferrule configured to hold a plurality of core wires.

The latch frame 22 has a tube shape. The optical fiber cable 1 is inserted into the latch frame 22 and is taken out from one axial end-side opening of the latch frame 22. The optical fiber cable 1 taken out from the latch frame 22 is covered with a boot 23 for preventing the cable from bending.

The plug frame 21 is disposed to protrude from the other axial end-side opening of the latch frame 22, and this plug frame 21 is connected to the adapter 5. In the below, a direction in which the plug frame 21 protrudes from the latch frame 22 is referred to as the front of the plug 2, and an opposite direction thereto is referred to as the rear. When the plug main body 10 is pulled rearward, the plug frame 21 is extracted from the adapter 5.

The plug frame 21 has a tube shape. In this example, the ferrule 20 is accommodated in the plug frame 21 so as to be moveable in a front and back direction in the plug frame 21. A coil spring 34 serving as a pressing member is further accommodated in the plug frame 21. The coil spring 34 is disposed between a flange part 35 of the ferrule 20 and an annular stopper 36 incorporated to a rear end-side opening of the plug frame 21, and is configured to press forward the ferrule 20, in other words, is pressed in an opposite direction to an extraction direction in which the plug frame 21 is to be extracted from the adapter 5. A front end portion 24 of the ferrule 20 pressed forward protrudes from a front end-side opening of the plug frame 21.

One surface 22a of an outer periphery of the latch frame 22 is provided with latches 25 that are to be engaged to the adapter 5. In the below, a direction that is perpendicular to a front and back direction in a plane of the outer surface 22a and is parallel with the outer surface 22a is referred to as a width direction of the plug 2. Also, a direction perpendicular to the outer surface 22a is referred to as an upper and lower direction of the plug 2, and the outer surface 22a-side is referred to as an upper side. In the meantime, the two latches 25 are disposed at an interval in the width direction, but one or more latches 25 may be provided.

The latch 25 extends forward from a support part 26 fixed to the outer surface 22a of the latch frame 22, and a front end portion 27 of the latch 25 is disposed above the plug frame 21. Gaps are formed between the latch 25 and the outer surface 22a of the latch frame 22 and an outer surface 21a of the plug frame 21, except for the support part 26. Thereby, when the latch 25 is elastically bent, the front end portion 27 can be displaced from the above of the outer surface 21a of the plug frame 21 toward the outer surface 21a. The front end portion 27 is accommodated in the adapter 5 together with the plug frame 21, and the front end portion 27 is provided with an engaging projection 28 that is to be engaged to the adapter 5.

The slider 11 has a cover part 30 disposed above the latch 25 and a gripping part 31 disposed at the rear of the latch frame 22. The outer surface 22a of the latch frame 22 and the cover part 30 face each other with the latch 25 being interposed therebetween, and the outer surface 22a and the cover part 30 are respectively provided with engaging portions 40, 41 to be engaged with each other. By both the engaging portions 40, 41, the slider 11 is supported to the latch frame 22 so that it can press down the cover part 30 from the above of the outer surface 22a toward the outer surface 22a, and the slider 11 is also supported to be moveable rearward, in other words, is supported to the latch frame 22 so as to be moveable in the extraction direction in which the plug frame 21 is to be extracted from the adapter 5.

As shown in FIGS. 3 and 4, the engaging portion 40 of the latch frame 22 is configured by a rib 42 fixed to the outer surface 22a of the latch frame 22 and a pair of wings 43 protruding from the rib 42 toward both sides in the width direction, and extends in the front and back direction.

The engaging portion 41 of the cover part 30 includes a pair of arms 44 disposed at an interval in the width direction. The pair of arms 44 is configured to sandwich the rib 42 and pair of wings 43 of the engaging portion 40 in the width direction, and the cover part 30 is guided in the front and back direction by engagement of the rib 42, the pair of wings 43 and the pair of arms 44. Each arm 44 is provided with an engaging claw 45, which is accommodated between the outer surface 22a of the latch frame 22 and the wing 43, and the cover part 30 is restrained from rising by engagement of the wing 43 and the engaging claw 45. Thereby, the slider 11 is supported to be moveable in the extraction direction. In the meantime, the gripping part 31 of the slider 11 is provided with an insertion hole 32 in which the boot 23 is to be inserted, and the slider 11 is auxiliarily supported by engagement of an inner periphery of the insertion hole 32 and the boot 23.

The engaging portion 41 further includes a stopper 46 configured to block a space between front end portions of the pair of arms 44. A moveable region of the slider 11 in the extraction direction is defined by the stopper 46 and the gripping part 31. When the slider 11 is moved in the extraction direction by a predetermined amount, the stopper 46 is contacted to a front end of the rib 42 of the engaging portion 40, so that the movement of the slider 11 in the extraction direction is hindered. Also, when the slider 11 is moved in an opposite direction to the extraction direction by a predetermined amount, the gripping part 31 is contacted to a rear end of the latch frame 22, so that the movement of the slider 11 in the opposite direction to the extraction direction is hindered.

Gaps are formed in an upper and lower direction between the rib 42 and pair of wings 43 and the cover part 30, and gaps are also formed in the upper and lower direction between the pair of arms 44 and the outer surface 22a of the latch frame 22. By the gaps, the slider 11 is supported so that it can push down the cover part 30 toward the outer surface 22a.

Both the engaging portions 40, 41 configured to support the slider 11 so as to be moveable in the extraction direction and to push down the cover part 30 of the slider 11 toward the outer surface 22a of the latch frame 22 are further configured so that when the slider 11 is moved in the extraction direction, the cover part 30 comes close to the outer surface 22a in correspondence to the movement of the slider 11.

In this example, a lower surface of the wing 43 facing the outer surface 22a of the latch frame 22 is provided with a guide surface 43a, an upper surface of the engaging claw 45 facing the wing 43 is provided with a guide surface 45a, and the guide surfaces 43a, 45a are all inclined to come close to the outer surface 22a as approaching toward the rear. When the slider 11 is moved in the extraction direction (rearward), a front end 43e of the wing 43 is slid along the guide surface 45a of the engaging claw 45 and a rear end 45e of the engaging claw 45 is slid along the guide surface 43a of the wing 43 in correspondence to the movement of the slider 11, so that the cover part 30 comes close to the outer surface 22a of the latch frame 22. In the meantime, the guide surface may be provided on any one of the engaging portions 40, 41.

Figure 5:
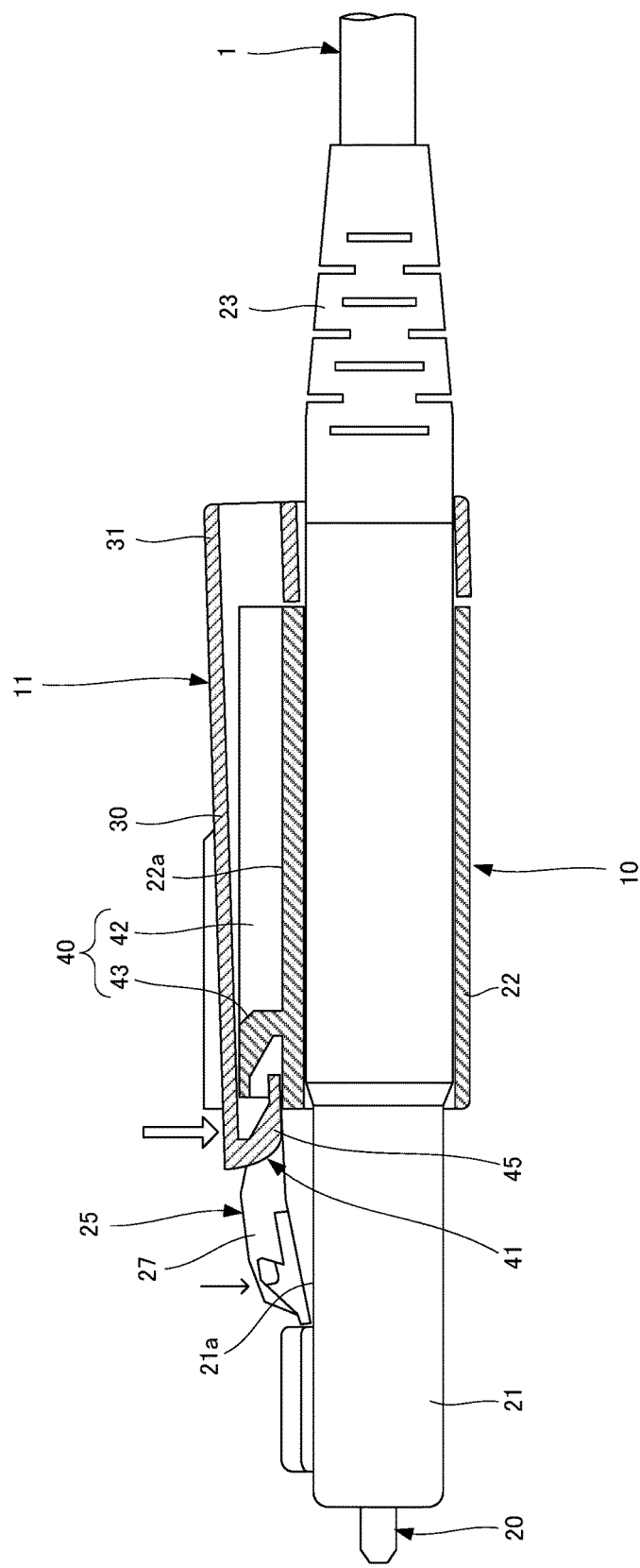
FIG. 5 A sectional view of the plug at a state where a cover part of the slider is pushed down.

FIG. 5 depicts a state where the cover part 30 is pushed down toward the outer surface 22a of the latch frame 22. The pushed-down cover part 30 is contacted to the latch 25, and the latch 25 is elastically bent and pushed down integrally with the cover part 30 toward the outer surface 22a. Thereby, the front end portion 27 of the latch 25 is displaced toward the outer surface 21a of the plug frame 21.

Figure 6:
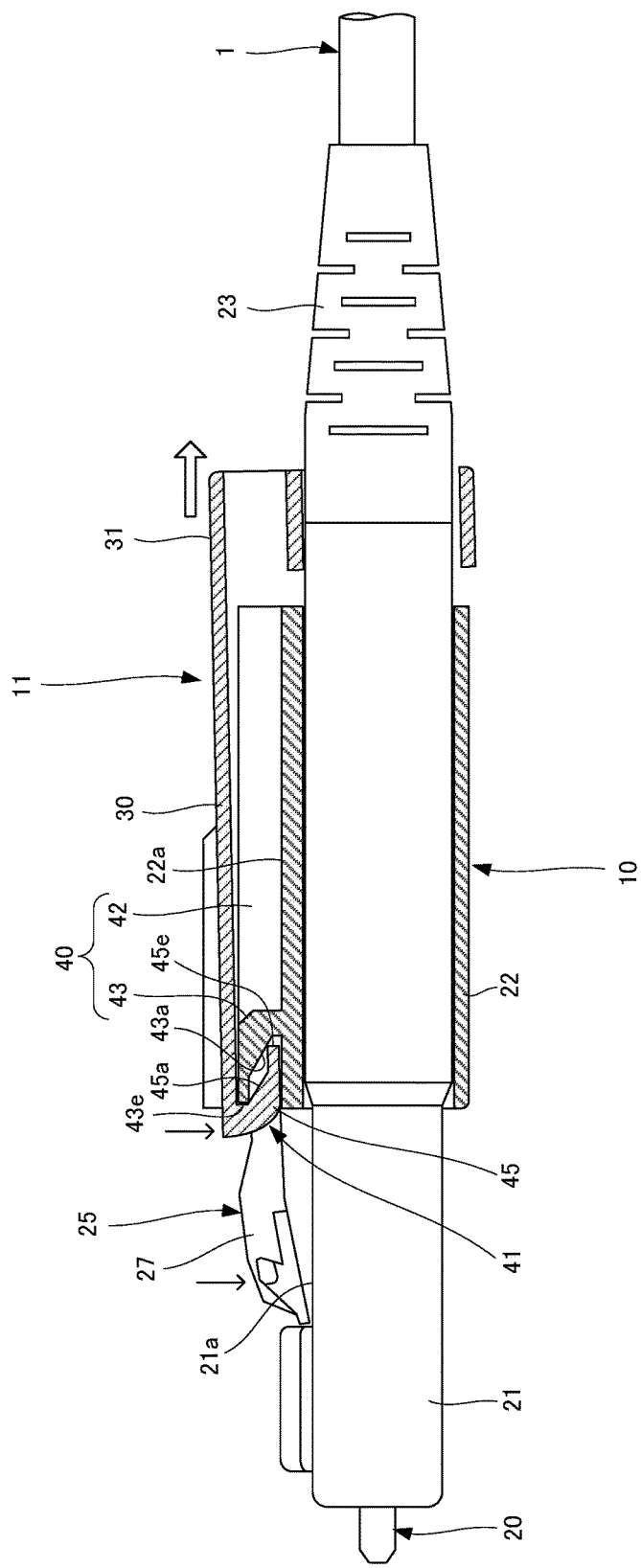
FIG. 6 A sectional view of the plug at a state where the slider is pulled.

FIG. 6 depicts a state where the cover part 30 comes close to the outer surface 22a of the latch frame 22 in correspondence to the movement of the slider 11 in the extraction direction. The cover part 30 approached to outer surface 22a is contacted to the latch 25, and the latch 25 is elastically bent and pushed down toward the outer surface 22a by the cover part 30. Thereby, the front end portion 27 of the latch 25 is displaced toward the outer surface 21a of the plug frame 21.

Figure 7:
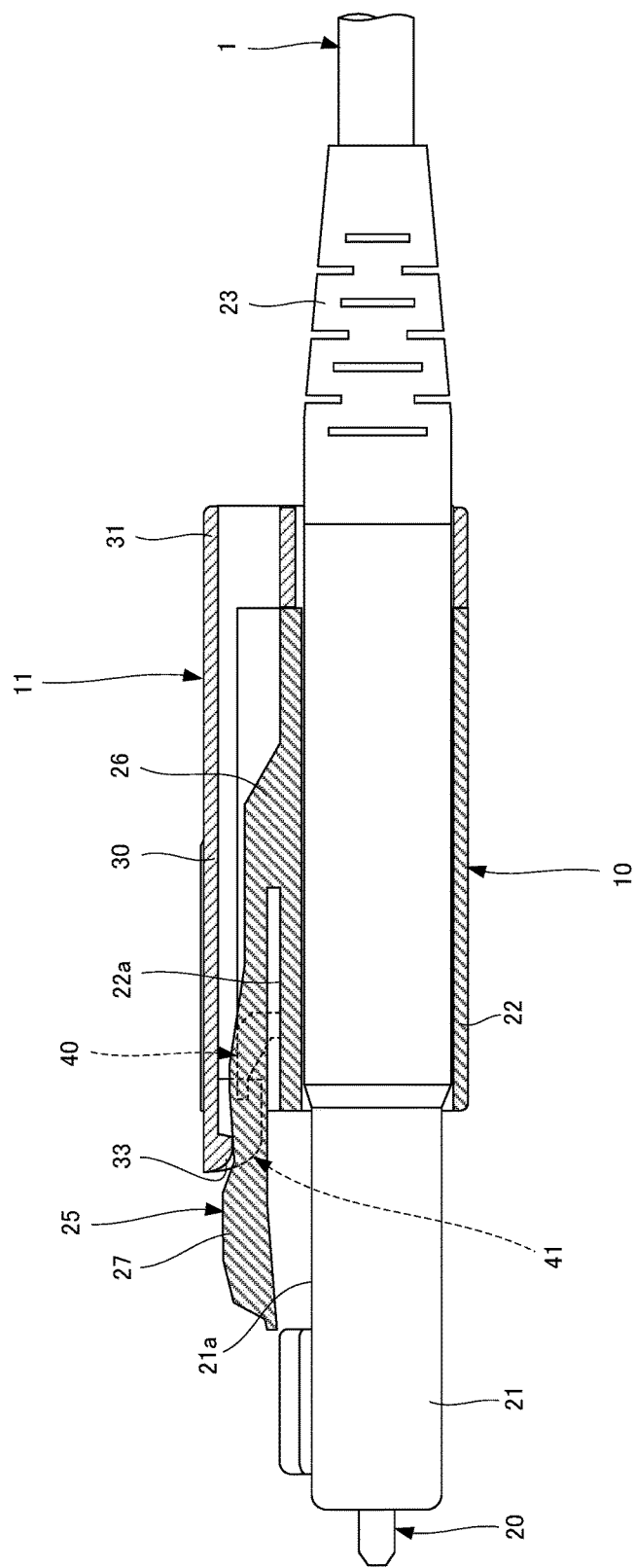
FIG. 7 A sectional view taken along a line VII-VII of FIG. 3.

As shown in FIG. 7, the cover part 30 is provided with pressing parts 33 to be contact the latches 25. The pressing part 33 is preferably provided to be adjacent to the engaging portion 41 of the cover part 30. In this example, the engaging portion 40 of the latch frame 22 is disposed between the pair of latches 25, the engaging portion 41 of the cover part 30 is disposed at a central portion of the cover part 30 in the width direction in correspondence to the engaging portion 40, and the pressing parts 33 are disposed at both sides of the engaging portion 41 in the width direction. When the cover part 30 comes close to the outer surface 22a of the latch frame 22 as the slider 11 is slid in the extraction direction, and the pressing part 33 is contacted to the latch 25 as the cover part 30 comes close to the outer surface 22a, since the pressing part 33 is provided in the vicinity of the engaging portion 41, the cover part 30 is suppressed from being bent, so that the latch 25 can be securely pushed down toward the outer surface 22a.

Also, at a state (refer to FIG. 4) where the slider 11 is disposed at one end, which is in an opposite direction to the extraction direction, of the moveable region of the slider 11 in the extraction direction, i.e., the gripping part 31 is in contact with the rear end of the latch frame 22, preferably, the latch 25 is elastically bent, and the cover part 30 is pressed by the latch 25 in a direction of away from the outer surface 22a of the latch frame 22. Thereby, the contact between the wings 43 of the engaging portion 40 and the guide surfaces 45a of the engaging portion 41 and the contact between the engaging claws 45 of the engaging portion 41 and the guide surfaces 43a of the engaging portion 40 are kept to suppress the rattling of the cover part 30 and to improve the operability of the slider 11.

Figures 8A, 8B, 8C:
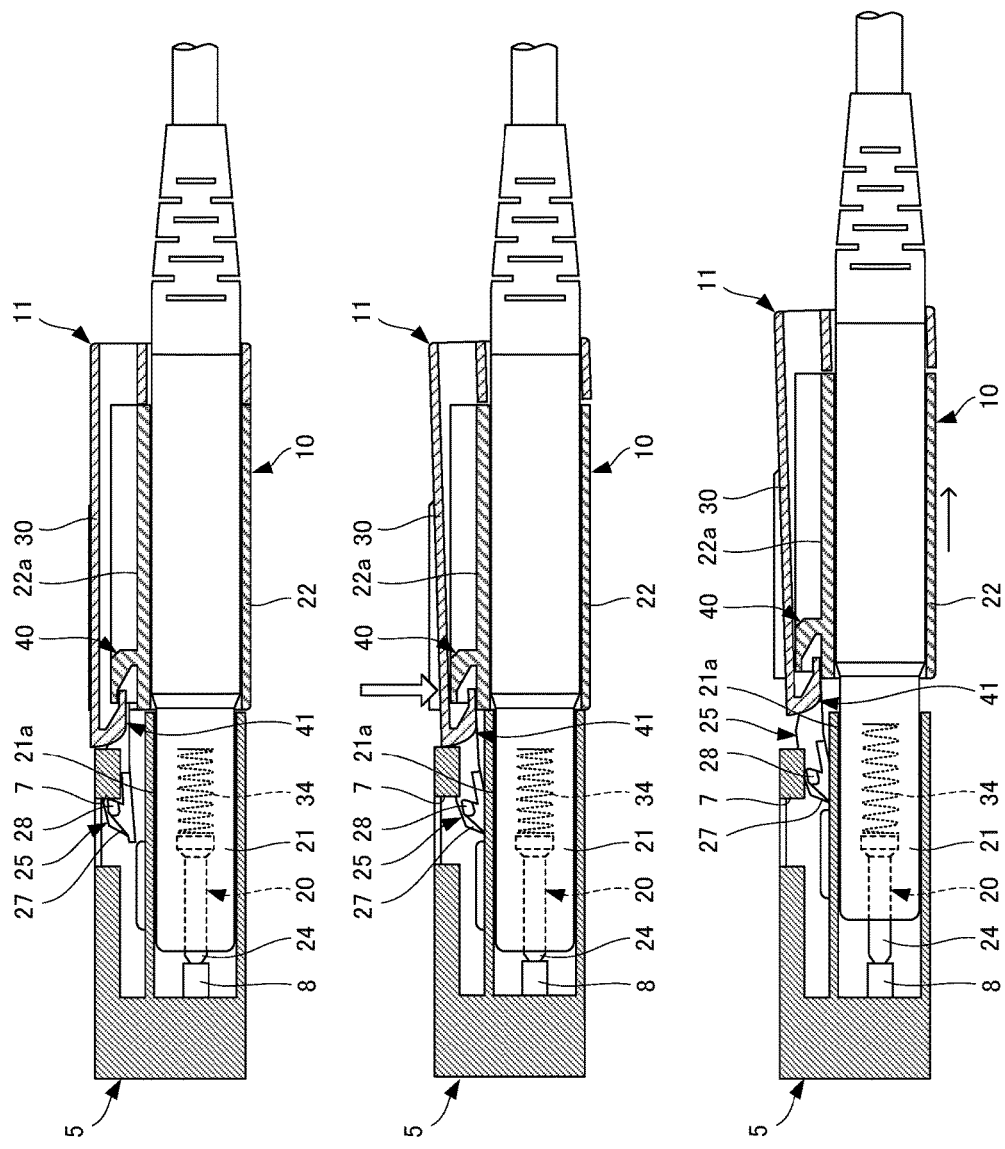
FIG. 8A A sectional view depicting operations of respective parts of the plug when a connecting state between an adapter and the plug is released.
FIG. 8B A sectional view depicting operations of the respective parts of the plug when the connecting state between the adapter and the plug is released.
FIG. 8C A sectional view depicting operations of the respective parts of the plug when the connecting state between the adapter and the plug is released.

FIGS. 8A to 8C depict operations of the respective parts of the plug 2 when the cover part 30 of the slider 11 is pushed down toward the outer surface 22a of the latch frame 22, so that the connecting state between the adapter 5 and the plug main body 10 is released.

As shown in FIG. 8A, the plug frame 21 of the plug main body 10 is connected to the adapter 5. The front end portion 27 of the latch 25 is also accommodated in the adapter 5, and the engaging projection 28 provided at the front end portion 27 is engaged to an engaging portion 7 of the adapter 5. The front end portion 24 of the ferrule 20 is pushed into the plug frame 21 with being in contact with a ferrule receiving part 8 of the adapter 5, and the coil spring 34 accommodated in the plug frame 21 is compressed. The ferrule 20 is pressed in the opposite direction to the extraction direction in which the plug frame 21 is to be extracted from the adapter 5, and the plug main body 10 is biased in the extraction direction by a biasing means including the ferrule 20 and the coil spring 34.

As shown in FIG. 8B, when the cover part 30 of the slider 11 is pushed down toward the outer surface 22a of the latch frame 22, as described above, the latch 25 is pushed down integrally with the cover part 30 toward the outer surface 22a, and the front end portion 27 of the latch 25 is displaced toward the outer surface 21a of the plug frame 21. As the front end portion 27 is displaced, the engaging state between the engaging projection 28 of the front end portion 27 and the engaging portion 7 of the adapter 5 is released, so that the connecting state between the adapter 5 and the plug frame 21 can be released.

As shown in FIG. 8C, when the engaged state of the latch 25 is released, the plug main body 10 biased in the extraction direction is automatically moved in the extraction direction. Specifically, the compressed coil spring 34 is restored with pushing the front end portion 24 of the ferrule 20 from the plug frame 21. As the front end portion 24 is pushed, the plug frame 21 is automatically pushed from the adapter 5 by a predetermined amount. Then, when the plug main body 10 is pulled in the extraction direction, the plug frame 21 is completely extracted from the adapter 5.

FIGS. 9A to 9C depict operations of the respective parts of the plug 2 when the connecting state between the adapter 5 and the plug main body 10 is released as the slider 11 is pulled in the extraction direction.

As shown in FIG. 9A, the plug frame 21 of the plug main body 10 is connected to the adapter 5. The front end portion 27 of the latch 25 is also accommodated in the adapter 5, and the engaging projection 28 provided at the front end portion 27 is engaged to the engaging portion 7 of the adapter 5.

As shown in FIG. 9B, when the slider 11 is pulled in the extraction direction, the cover part 30 comes close to the outer surface 22a of the latch frame 22 in correspondence to the movement of the slider 11 in the extraction direction, the latch 25 is pushed down toward the outer surface 22a by the cover part 30, and the front end portion 27 of the latch 25 is displaced toward the outer surface 21a of the plug frame 21, as described above. As the front end portion 27 is displaced, the engaging state between the engaging projection 28 of the front end portion 27 and the engaging portion 7 of the adapter 5 is released, so that the connecting state between the adapter 5 and the plug frame 21 can be released.

As shown in FIG. 9C, when the slider 11 is continuously pulled in the extraction direction, the slider 11 reaches one end of the moveable region in the extraction direction, and then the plug main body 10 is also pulled integrally with the slider 11 in the extraction direction, so that the plug frame 21 is extracted from the adapter 5.

In this way, the engaged state of the latch 25 can be released by the two operations of the pushing-down operation of the cover part 30 of the slider 11 and the pulling operation of the slider 11, so that the usability of the plug 2 is excellent.

Also, in this example, when the plug main body 10 is biased in the extraction direction and the engaged state of the latch 25 is released by the pushing-down operation of the cover part 30, the plug main body 10 is automatically moved in the extraction direction upon the release of the engaging state of the latch 25, so that the engaging projection 28 of the latch 25 is separated from the engaging portion 7 of the adapter 5. Thus, when pulling the plug main body 10 in the extraction direction so as to completely extract the plug frame 21 from the adapter 5, it is possible to make the pushing-down operation of the cover part 30 unnecessary, so that it is possible to improve the operability of the plug 2. In the meantime, the biasing means for biasing the plug main body 10 in the extraction direction includes the ferrule 20 and the coil spring 34 configured to press the ferrule 20. However, the pressing member configured to press the ferrule 20 may be an elastic body such as a plate spring, a rubber or the like.

Although the illustrative embodiments have been described with reference to the optical fiber cable 1 and the plug 2 attached to the terminal part thereof, the illustrative embodiments are just exemplary and can be changed without departing from the gist of the disclosure. For example, the cable may be an electric cable (for example, a LAN (Local Area Network) cable or the like) in which a conductor is used for the core wire. Also, the cable includes a branch cable in which a plurality of branch wires extends from a main wire. When the branch cable is used, the cable terminal part to which the plug is attached includes a terminal part of the main wire and/or a terminal part of each branch wire.

The invention claimed is:

1. A plug comprising:
   a plug main body to be connected to an adapter;
   a latch provided at the plug main body so as to be elastically displaceable from an outside of the plug main body toward an outer surface of the plug main body, the latch being configured to be engaged to the adapter at a state where the plug main body is connected to the adapter and to be released from an engaged state to the adapter as the latch is displaced from the outside toward the outer surface; and
   a slider comprising a cover part that is disposed at the outside of the latch,
   wherein the slider is supported to the plug main body such that the slider is able to push down the cover part from the outside toward the outer surface, and the slider is supported to the plug main body such that the slider is moveable in an extraction direction in which the plug main body is to be extracted from the adapter,
   wherein the plug main body and the cover part have engaging portions to be engaged with each other, respectively, and at least one of the engaging portion of the plug main body and the engaging portion of the cover part is provided with a guide surface configured to come close to the outer surface of the plug main body as approaching toward the extraction direction,
   wherein when the cover part is pushed down toward the outer surface, the latch is pushed down integrally with the cover part toward the outer surface, and
   wherein when the slider is moved in the extraction direction, one of the engaging portions is slid along the guide surface of the other of the engaging portions, so that the cover part comes close to the outer surface of the plug main body and the latch is pushed down toward the outer surface by the cover part.

2. The plug according to claim 1,
   wherein the cover part comprises a pressing part that is configured to press the latch, and
   wherein the pressing part and the engaging portion of the cover part are disposed to be adjacent to each other.

3. The plug according to claim 1,
   wherein at a state where the slider is disposed at one end, which is in an opposite direction to the extraction direction, of a moveable region of the slider in the extraction direction, the cover part is pressed by the latch in a direction of away from the outer surface of the latch frame, and one of the engaging portions is in contact with the guide surface of the other of the engaging portion.

4. The plug according to claim 1, further comprising a biasing means for biasing the plug main body in the extraction direction at the state where the plug main body is connected to the adapter.

5. The plug according to claim 4,
   wherein the biasing means comprises:
      a holding member configured to hold a core wire of a cable, to which the plug is to be attached, and to be in contact with the adapter at the state where the plug main body is connected to the adapter; and
      a pressing member configured to press the holding member in an opposite direction to the extraction direction.

6. A cable with plug, in which the plug according to claim 1 is attached to a terminal part of the cable.

* * * * *